(12) United States Patent
Atkinson et al.

(10) Patent No.: US 9,081,207 B2
(45) Date of Patent: Jul. 14, 2015

(54) EYEGLASSES STRUCTURES

(71) Applicant: Mercy Medical Research Institute, Springfield, MO (US)

(72) Inventors: Scott Atkinson, Springfield, MO (US); Martin Reuter, Flemington, MO (US); Rahul Eapen, Monett, MO (US)

(73) Assignee: Mercy Medical Research Institute, Springfield, MO (US)

( * ) Notice: Subject to any disclaimer, the term of this patent is extended or adjusted under 35 U.S.C. 154(b) by 95 days.

(21) Appl. No.: 13/787,449

(22) Filed: Mar. 6, 2013

(65) Prior Publication Data

US 2013/0235327 A1    Sep. 12, 2013

Related U.S. Application Data

(60) Provisional application No. 61/607,297, filed on Mar. 6, 2012.

(51) Int. Cl.
*G02C 5/06* (2006.01)
*G02C 5/22* (2006.01)

(52) U.S. Cl.
CPC .............. *G02C 5/06* (2013.01); *G02C 5/2209* (2013.01); *G02C 2200/08* (2013.01); *G02C 2200/10* (2013.01); *G02C 2200/16* (2013.01)

(58) Field of Classification Search
CPC .............. G02C 5/02–5/10; G02C 5/14–5/20; G02C 5/22–5/229; G02C 2200/06; G02C 2200/16; G02C 5/2209; G02C 5/2218; G02C 5/2227; G02C 5/2236; G02C 5/2245; G02C 5/2254; G02C 5/2263; G02C 5/2272; G02C 5/2281
USPC ......... 351/111–123, 124, 126, 129, 133, 140, 351/149, 150, 153; 16/228
See application file for complete search history.

(56) References Cited

U.S. PATENT DOCUMENTS

| | | |
|---|---|---|
| 2,148,397 A | 2/1939 | Bock |
| 4,029,403 A | 6/1977 | Harris |
| 4,479,703 A | 10/1984 | Enghofer |
| 5,410,374 A | 4/1995 | Smith |
| 5,781,273 A | 7/1998 | Boden |
| 5,805,261 A | 9/1998 | Houston et al. |
| 6,728,974 B2 | 5/2004 | Wadsworth |
| 7,237,892 B2 | 7/2007 | Curci et al. |
| 2010/0302500 A1* | 12/2010 | Cargnel .......................... 351/63 |

* cited by examiner

*Primary Examiner* — Huy K Mai
(74) *Attorney, Agent, or Firm* — Michael A. Williamson; Polsinelli PC

(57) ABSTRACT

The eyeglass frame is an improved eyeglass frame with dislocating joints. The dislocating joints prevent damage to the eyeglass frame when external forces are applied to the structure and allow for the frame to be disconnected, if so desired. The joints dislocate without completely separating from the other components of the eyeglass frame or becoming damaged, and the joints can be quickly reconnected without tools.

13 Claims, 15 Drawing Sheets

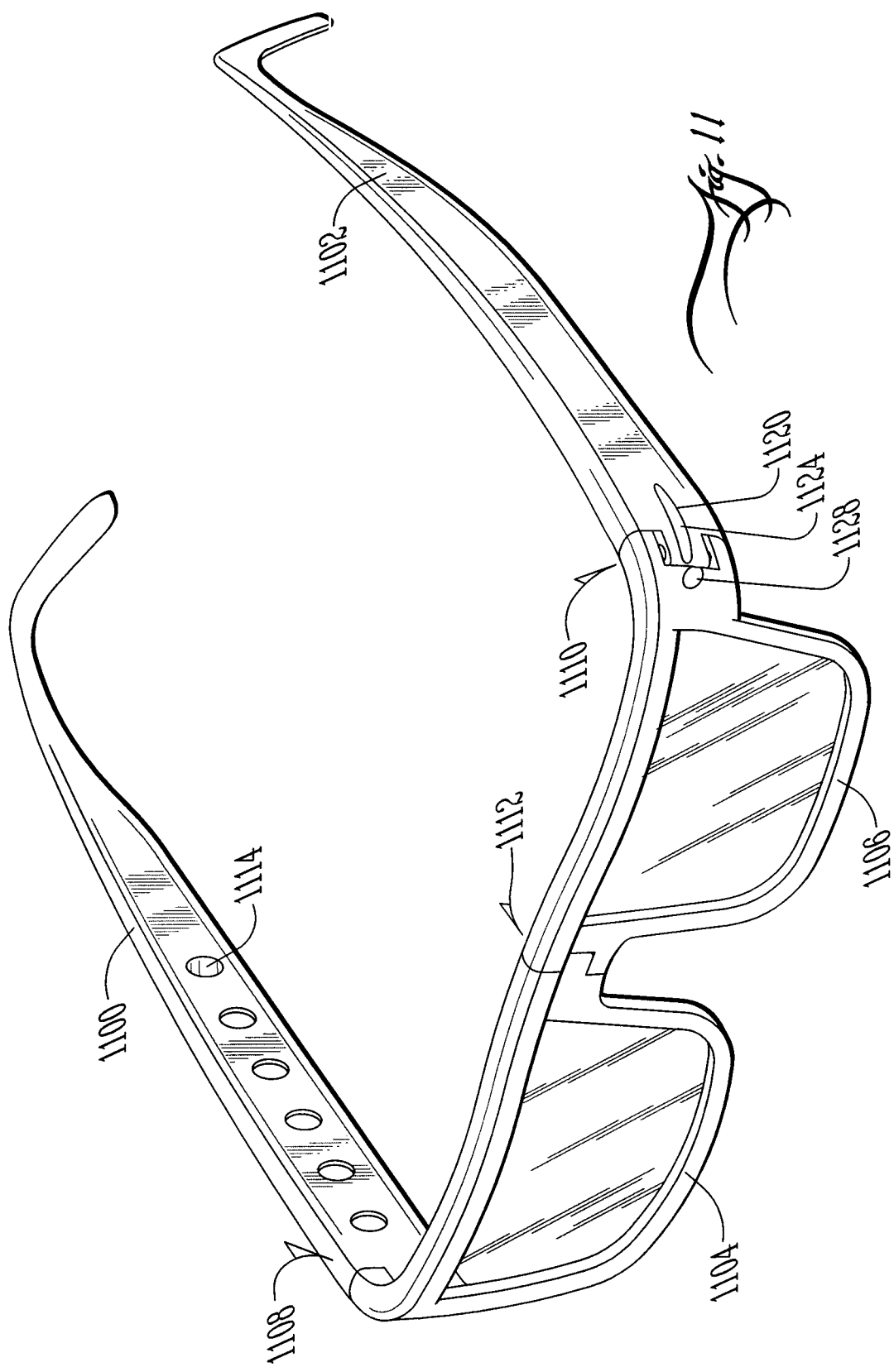

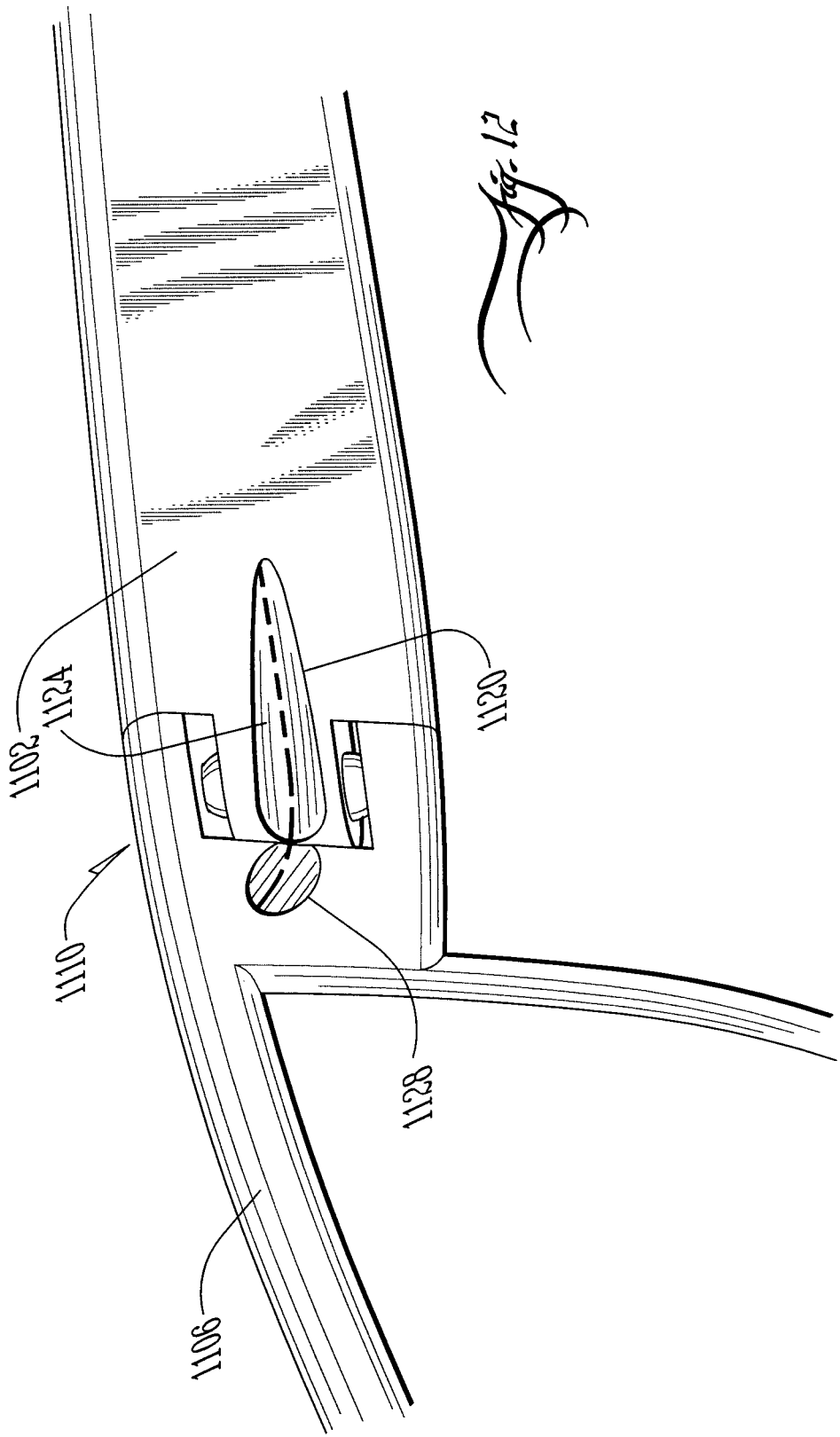

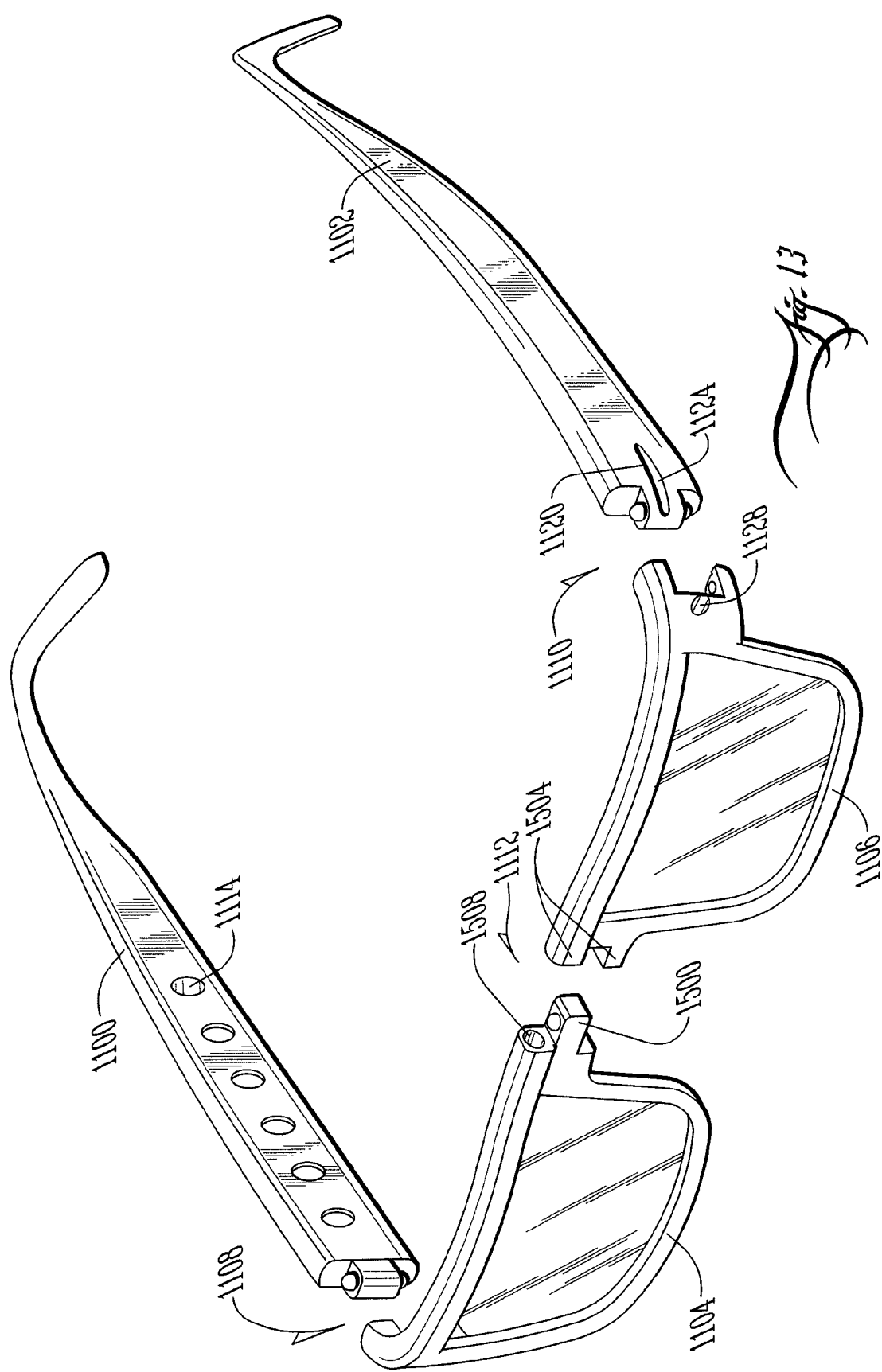

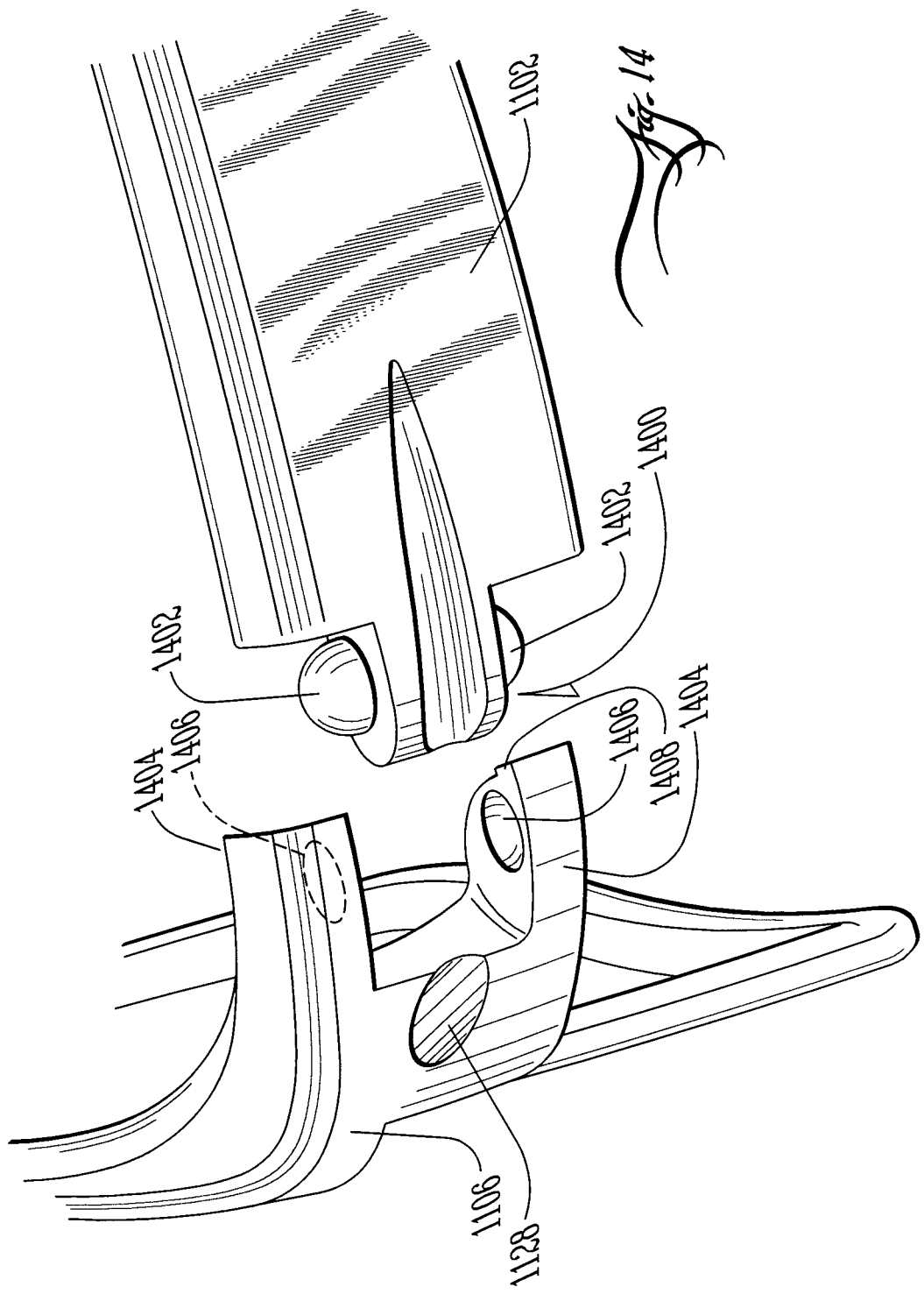

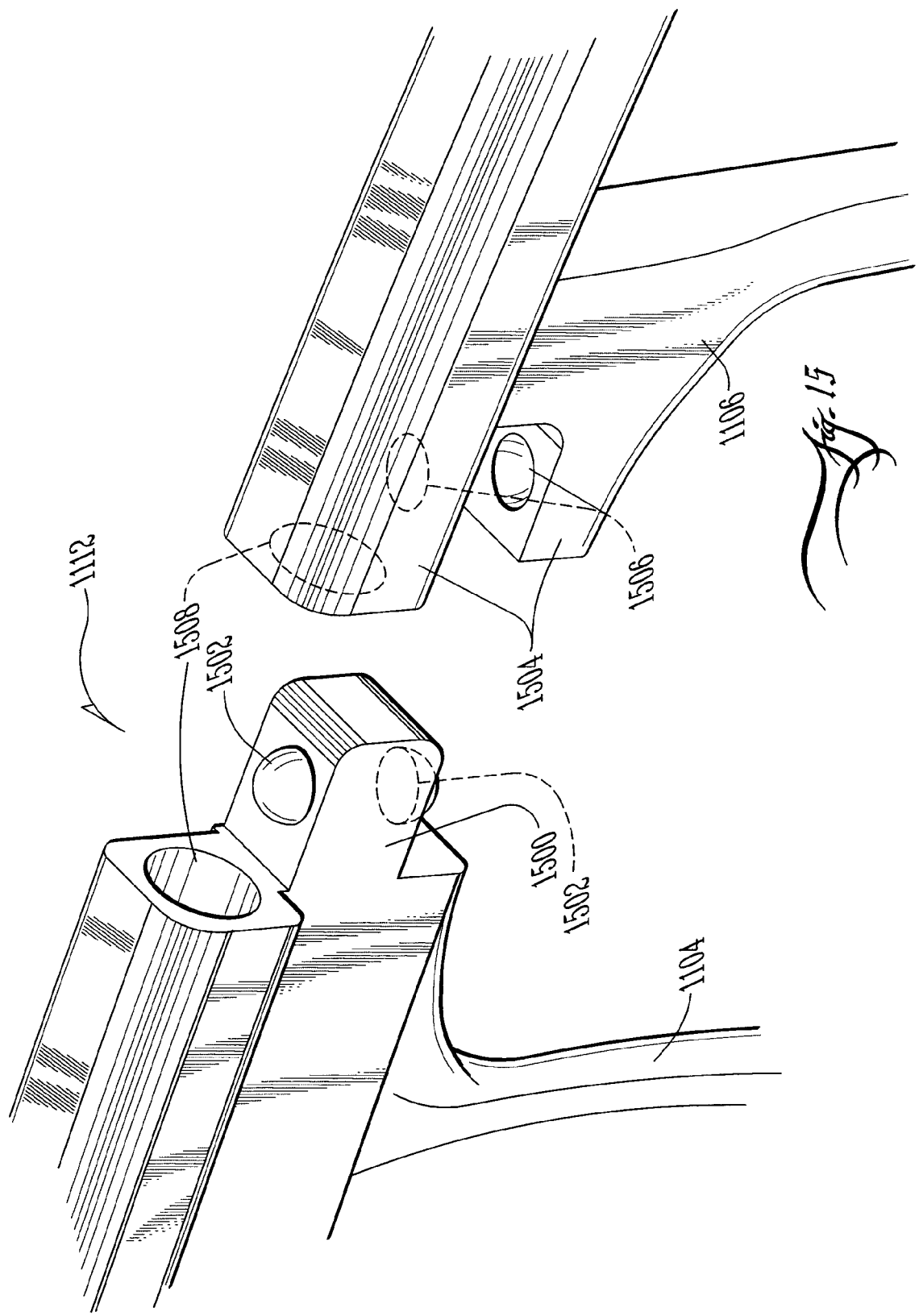

EYEGLASSES STRUCTURES

CROSS-REFERENCE TO RELATED APPLICATIONS

This non-provisional application claims priority of U.S. Provisional Patent Application No. 61/607,297 filed on Mar. 6, 2012, which application is incorporated herein by reference.

BACKGROUND

Field of the Invention

The eyeglass frames disclosed herein relate generally to eyewear assemblies and methods for manufacturing eyewear assemblies. The eyeglass frames relate more specifically to eyewear with removable and replaceable components. The eyeglass frames also relate to eyewear with components that are flexibly connected to one another and are capable of disconnection at the temple or side arm joint and the nose bridge area of the eyeglass frame.

SUMMARY OF THE INVENTION

In an embodiment of the invention, it comprises a frame for eyeglasses comprising a left rim member and a right rim member; a nose bridge assembly connecting the left rim member to the right rim member; a left temple arm and a right temple arm; a left and a right dislocating joint connecting the left temple arm and the right temple arm to the left rim member and the right rim member, respectively; wherein the nose bridge assembly comprises a left and a right nose bridge component, a channel disposed through the left and right nose bridge components, and an elastic band disposed in the channel and anchored to the frame so as to resist the separation of the left and right nose bridge components.

In other embodiments the frame for eyeglasses further comprise a channel provided in each of the left and right rim members and the left and right temple arms for receiving the elastic band, wherein one end of the elastic band is secured in the channel in the left temple arm and the other end of the elastic band is secured in the channel in the right temple arm; and the elastic band extends through the channel in the left and right temple arms and the left and right rim members to flexibly attach the members together.

In other embodiments, the left and the right nose bridge components comprise a ball member having a ball on a first end thereof and a socket member having a socket on a first end thereof, wherein the ball is disposed in the socket.

In further embodiments the left and the right dislocating joints each comprise: a left and a right socket member attached to the left and the right rim member, respectively; a left and a right hinge member attached to the left and right side temple arms, respectively; wherein the left and the right socket member comprise a socket for receiving the hinge member and a stop member; and wherein the left and the right hinge member each comprise a cylinder having two circular ends and a face extending therebetween, a protrusion on at least one of the circular ends of the cylinder for engaging the indentations in the socket, and a detent for engaging the stop member on the socket member.

In additional embodiments a first end of the channels in each of the left and right temple arms terminates at a point along the length of each temple arm with an opening wherein a retention device is provided to secure the ends of the elastic band at said points.

In additional embodiments the left and right nose bridge components comprise: a hinge member attached to one of the left or right rim members having protrusions on the top and bottom of the hinge member; and a hinge arm member attached to the other of the left or right rim members having a top and a bottom arm with indentations therein for receiving the protrusions on the hinge member; wherein the hinge member is pivotally maintained between the top and bottom arms of the hinge arm member by the engagement of the protrusions into the indentations.

In additional embodiments the left and the right dislocating joints each comprise: an temple hinge member attached to each of the left and right temple arms having protrusions on the top and bottom of the hinge member; an temple hinge arm member attached to each of the left and right rim members, each temple hinge arm member having a top arm and a bottom arm with indentations therein for receiving the protrusions on the temple hinge member; wherein the temple hinge member is pivotally maintained between the top and bottom arms of the temple hinge arm member by the engagement of the protrusions on the temple hinge member into the indentations on the temple hinge arm member.

In other embodiments each temple hinge member further comprises a groove in communication with the channel in the temple arm for receiving and retaining the elastic band.

In an additional embodiment of the eyeglass frame, the frame comprises a left temple arm, a right temple arm, a left rim, a right rim, and an elastic band, wherein the left rim and the right rim are releaseably connected at a bridge; the left temple arm is releaseably connected to the left rim; the right temple arm is releaseably connected to the right rim; and the elastic band is disposed through the releaseable connection at the bridge. Additional embodiments of the frame are described, wherein the releaseable connection at the bridge comprises a ball member attached to one of the left or right rim members and a socket member attached to the other of the left or right rim members.

Further embodiments are described, wherein the releaseable connection between the left and right temple arms and the left and right rims comprise a hinge socket and a stop member disposed in each of the left and right rim members, a detent and a hinge cylinder having a protrusion on one end thereof disposed on each of the left and right temple arms; wherein the hinge socket further comprises an indentation for engaging the protrusion on the hinge cylinder, and wherein the stop member engages the detent.

Other described embodiments are provided wherein the elastic band is disposed in a channel through each of the left and right rim members and attached at opposing ends thereof to the left and right temple arms.

Further described embodiments are provided wherein the releaseable connections at the bridge and between the rims and the temple arms each comprise a middle hinge arm attached to one of the left or right rim members or to one of the left or right temple arms, and a top and bottom hinge arm attached to the left or right rim members; wherein the middle hinge arm further comprises a protrusion on each of a top and a bottom surface of the middle hinge arm; and wherein the top hinge arm further comprises an indentation on a bottom surface thereof; and wherein the bottom hinge arm further comprises an indentation on a top surface thereof; and wherein the protrusions engage the indentations to retain the middle hinge arm between the top and bottom hinge arms.

In another embodiment, the frame comprises a frame for eyeglasses comprising a left temple arm, a right temple arm, a rim member, and a first and a second elastic band, wherein the left temple arm is releaseably connected to the rim member; the right temple arm is releaseably connected to the rim member; and the first and second elastic bands are disposed through the releaseable connections between the left and right temple arms and the rim member.

In a further embodiment of the eyeglass frames the releaseable connections between the rim member and the left and right temple arms each comprise a middle hinge arm attached to one of the left or right temple arms, and a top and bottom hinge arm attached to the rim member; wherein the middle hinge arm further comprises a protrusion on each of a top and a bottom surface of the middle hinge arm; and wherein the top hinge arm further comprises an indentation on a bottom surface thereof; and wherein the bottom hinge arm further comprises an indentation on a top surface thereof; and wherein the protrusions engage the indentations to retain the middle hinge arm between the top and bottom hinge arms.

In an additional embodiment each of the first and second elastic bands are disposed in a first and a second channel through opposing ends of the rim member and attached at opposing ends thereof to the left and right temple arms and the rim member.

BRIEF DESCRIPTION OF THE DRAWINGS

FIG. 11 is a perspective view of a fourth embodiment of the eyeglass frame.

FIG. 12 is a partial perspective view of the fourth embodiment of the eyeglass frame.

FIG. 13 is a partial perspective view of a fourth embodiment of the eyeglass frame.

FIG. 14 is a partial exploded view of the fourth embodiment of the eyeglass frame.

FIG. 15 is a partial exploded view of the fourth embodiment of the eyeglass frame.

DETAILED DESCRIPTION

The eyeglass frames disclosed herein provide eyeglass frames with dislocating joints at the nose bridge and side, or temple, arms of the eyeglass frame. These dislocating joints are an improvement over other eyeglass frames with flexible joints because they provide an improved method of dislocating the temple joint or nose bridge without damaging the eyeglass frame, and allowing it to return to the normal position. This may be utilized to avoid damage to the frames during usage or to allow the user of the frames to detach and store the frame components.

Figure 1:
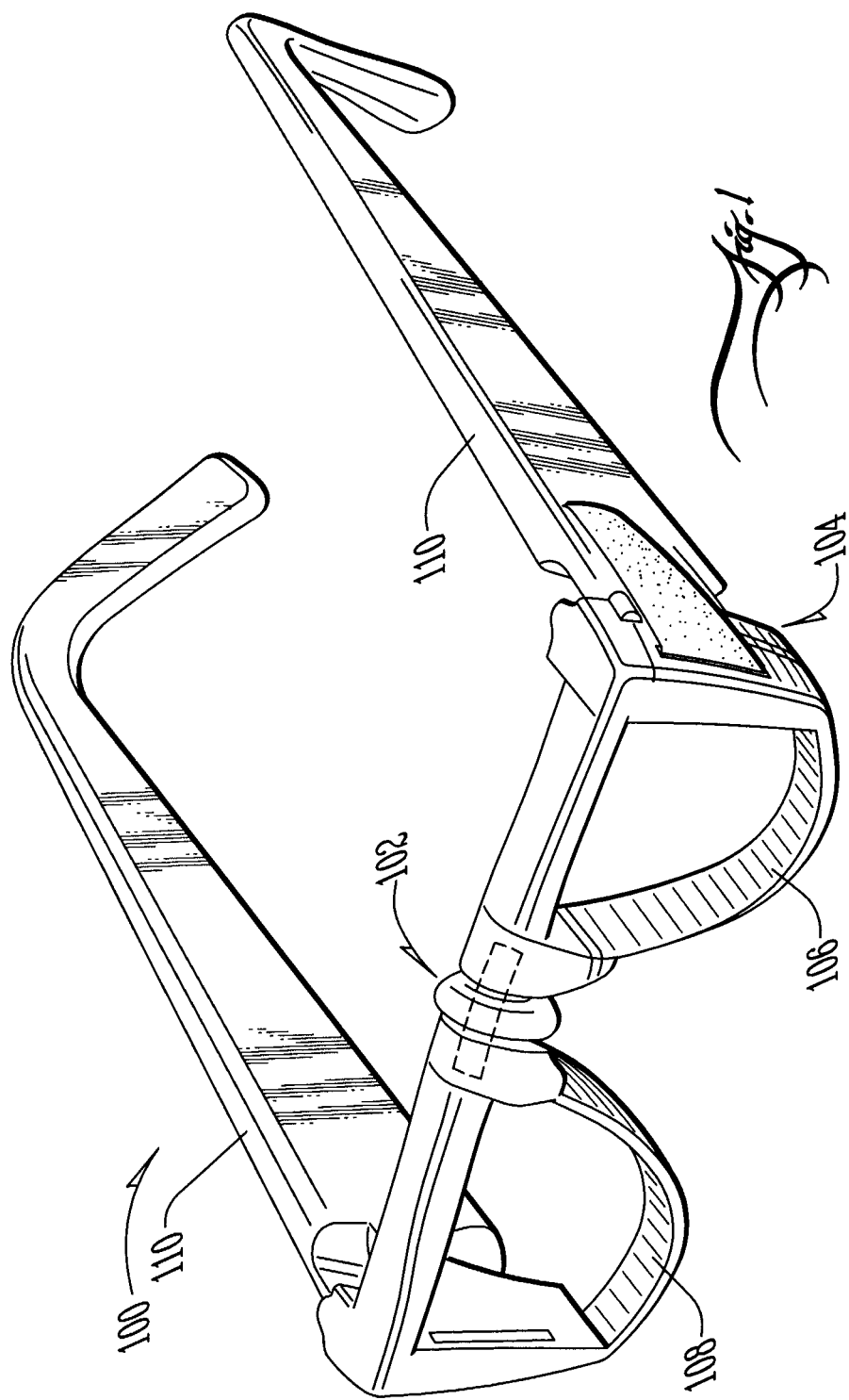
FIG. 1 is a perspective view of an embodiment of the eyeglass frame.

Referring now to FIG. 1, a perspective view of an embodiment of the eyeglass frames disclosed herein is depicted. The eyeglass frames 100 are provided with a flexible dislocating bridge 102 and flexible dislocating hinges 104 that allow the eyeglass frames 100 to flex, temporarily deform or even dislocate at the joints when placed under stress. Once the stress is removed the eyeglass frames 100 may return to their desired shape under the elastic tension in an elastic band member, as described below.

The eyeglass frames 100 include two rim members 106 and 108 and two temple arms 110. The rim members are joined at the bridge 102 as depicted in more detail in FIG. 2. A ball member 112 is attached to one of rim members 106 or 108. A socket member is attached to the other rim member 106 or 108. An elastic band 116 is provided through the bridge 102 to maintain the connection between the two rim members.

The bridge 102 does not rotate because the ball and socket are preferably elliptical in cross-section, or a similar shape that resists rotation. Various asymmetrical shapes for the ball and socket may be susceptible for use with the eyeglass frames 100. This cross-sectional shape prevents the rotation of the ball in the socket and keeps the nose bridge rigid. However, the ball may be pulled out of or popped into the socket by flexion of the socket or compression of the ball under force. When out of the socket the elastic band keeps the two rim members 106 and 108 adjacent to one another.

Figure 2:
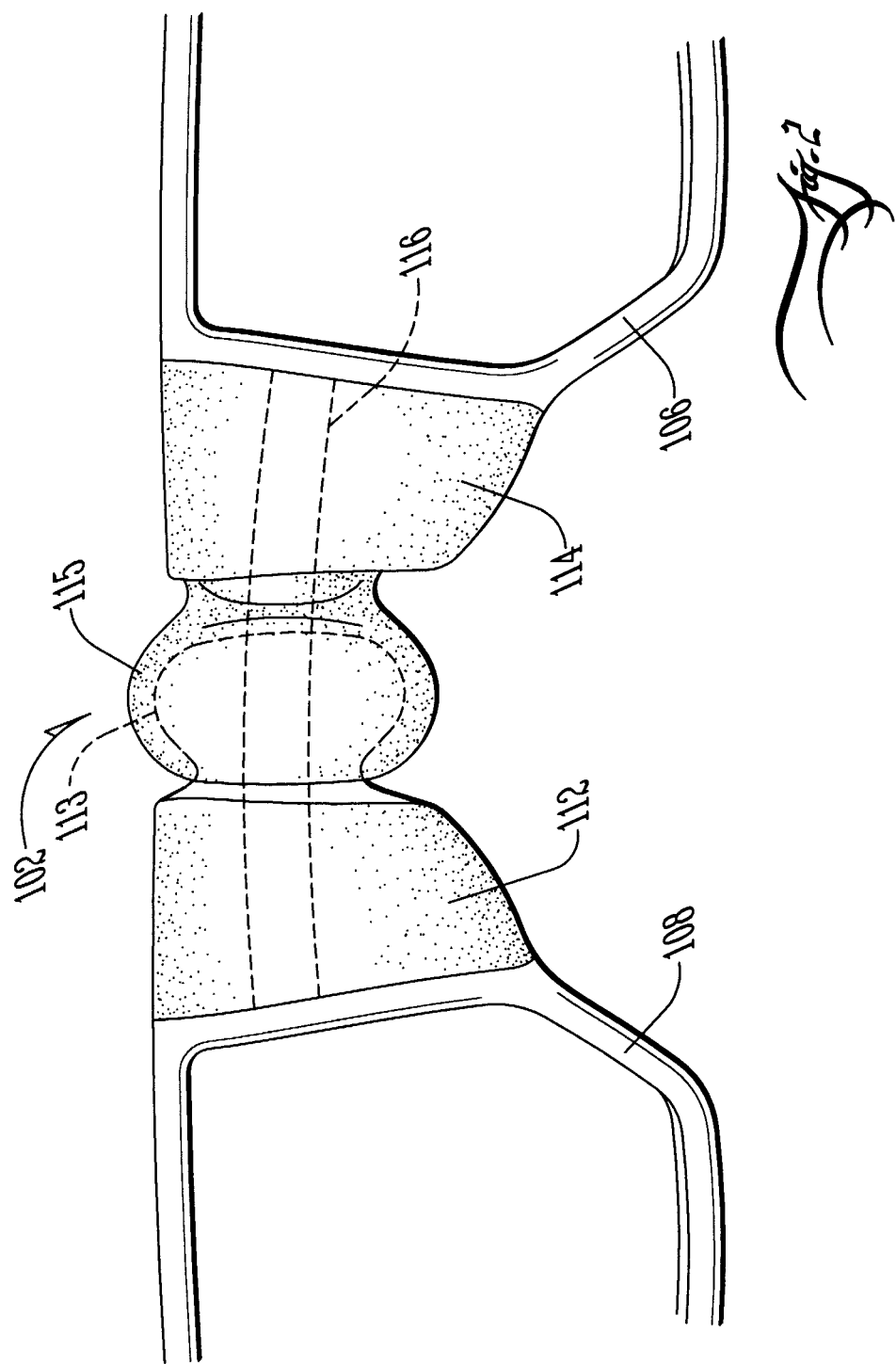
FIG. 2 is a side view of the nose bridge of an embodiment of the eyeglass frame.
Figure 3:
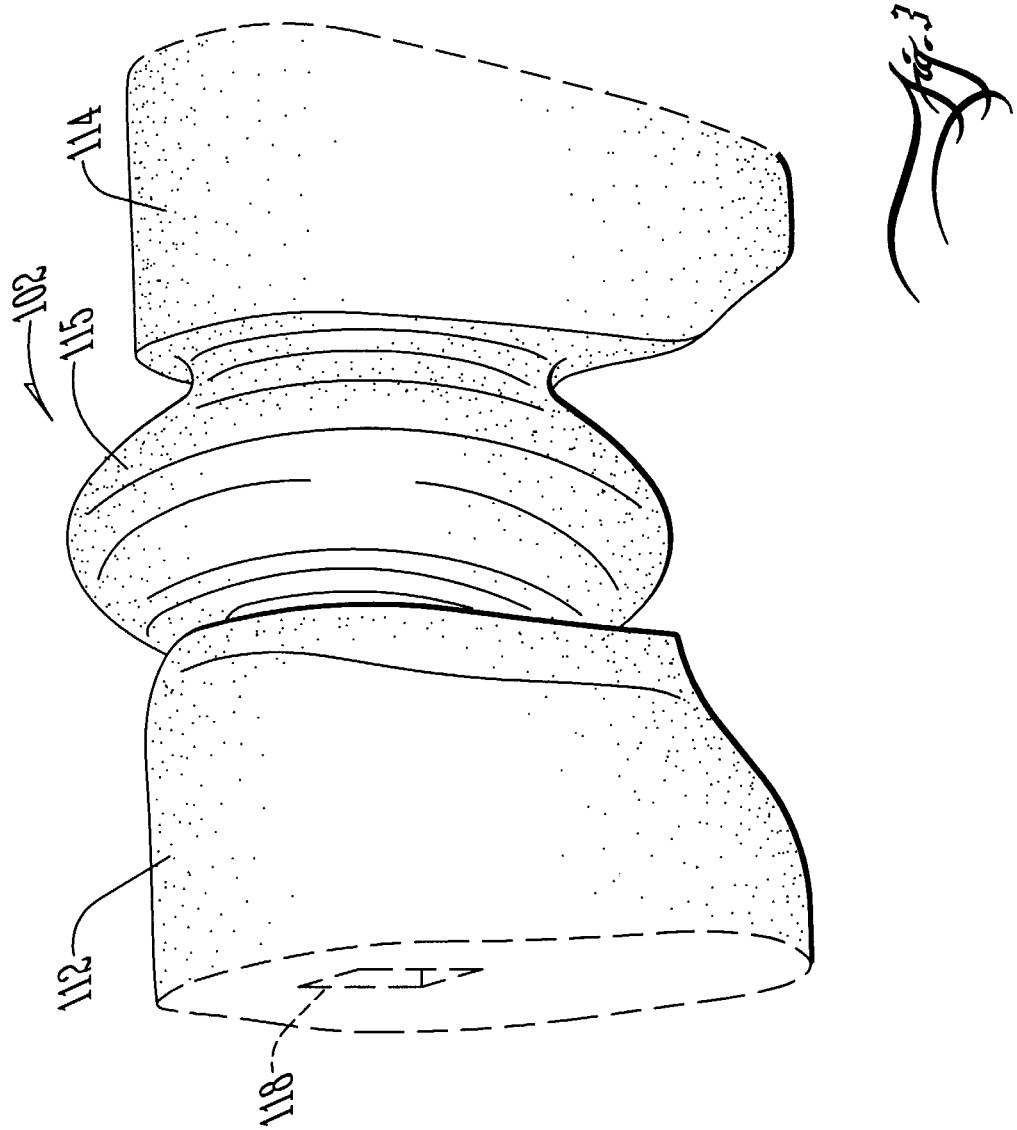
FIG. 3 is a perspective view of the nose bridge of an embodiment of the eyeglass frame.

Referring now to FIGS. 2 and 3, a side view of the nose bridge of an embodiment of the eyeglass frame and a perspective view of the same, respectively, are depicted. The nose bridge comprises a ball member 112 and a socket member 114. The ball member 112 is attached at one end thereof to one of rim member 106 or 108. The other end of ball member 112 is provided with a ball 113 for joining to the socket member 114. The ball 113 may be spheroid or substantially spheroid in shape. As is more clearly shown in relation to FIG. 4, the ball 113 in this embodiment is an irregular spheroid in that certain surfaces of the spheroid have been flattened to improve the fit of the ball 113 and socket 115.

The socket member 114 is attached at one end thereof to one of rim member 106 or 108. The other end of socket member 114 is provided with a socket 115 for receiving ball 113. The socket 115 defines an interior volume that is shaped to receive ball 113 and hold it in a specific orientation and to resist bending, rotation or separation of the ball 113 in the socket 115. The ball and socket are formed from a material that is rigid enough to maintain its shape and resist deformation or dislocation under normal forces encountered when wearing the eyeglass frames.

However, the material must be able to deform sufficiently to allow dislocation of the ball 113 from the socket 115 under the influence of an external force before damage results to either the ball or socket or to the other components of the eyeglass frame. Similarly, the ball 113 and socket 115 must be able to deform sufficiently to allow the user to reconnect the nose bridge by inserting the ball 113 into the socket 115 by application of appropriate force, after which insertion the materials must return to the desired shape to provide the fixed orientation between the two rim members 106 and 108.

Figure 4:
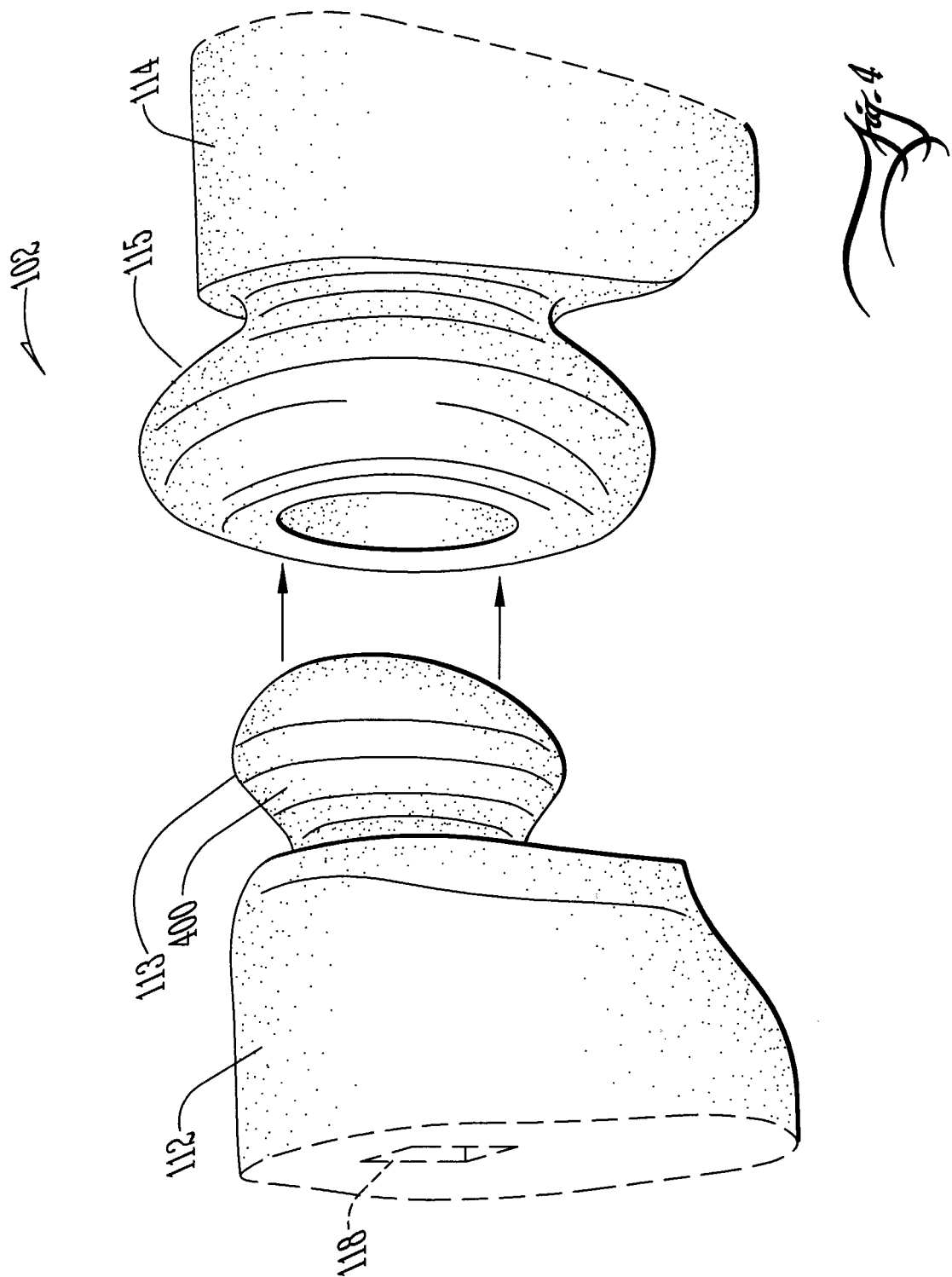
FIG. 4 is an exploded perspective view of the nose bridge of an embodiment of the eyeglass frame in a disassembled configuration.

In other embodiments of the eyeglass frame, the ball 113 and socket 115 may be shapes other than spheroid. Any shape of ball and socket is useful in the disclosed eyeglass frame so long as the shape allows the ball 113 to snap into the socket 115 and to be held in the desired orientation, subject to flexing and dislocation from external forces as described above. As can be seen in FIG. 4, the ball 113 may be an irregular spheroid in that it may have some flattened surfaces such as surface 400.

An elastic band 116 is provided in a channel extending through ball 113 and socket 115 and into members 112 and 114. As can be seen more clearly in FIG. 3, the members 112 and 114 are provided with a channel 118 for the elastic member 116. The ends of elastic band 116 may be anchored in members 112 and 114, or it may extend through members 106 and 108 as depicted in relation to later figures. The elastic band 116 may be slightly stretched when the ball 113 and socket 115 are connected as shown in FIG. 2. This provides additional force to hold ball 113 in socket 115 during normal wear, without completely preventing the flexing or dislocation of the ball and socket joint. When the ball 113 is dislocated from socket 115, the elastic band 116 also retains the two pieces adjacent to each other and prevents the eyeglass frame from completely separating into two pieces.

In the embodiment shown in FIG. 2, the surfaces of ball member 112 and socket member 114 are formed to provide a nose rest to receive the nose of the wearer and support the eyeglass frame thereon. In other embodiments of the eyeglass frame, the members 112 and 114, or rim members 106 and 108 may be provided with nose pads or other appendages to support the eyeglass frame on the nose of the wearer.

The ball 113 and socket 115 may be formed in a single piece with members 112 and 114, or may be separate components that are attached to the members 112 and 114 by a known form of attachment for the materials used, such as gluing, welding, screwing, interlocking joints, or other such methods. In some embodiments, the ball and socket members 112 and 114, and ball 113 and socket 115 may be incorporated into and form a single unitary component with a rim member 106 or 108. In other embodiments of the eyeglass frame, members 112 and 114 may be of smaller size or not provided at all, in which case ball 113 and socket 114 may be directly attached to rim members 106 and 108.

Referring now to FIG. 4, an exploded perspective view of the bridge 102 of an embodiment of the eyeglass frame is depicted. As mentioned before, the ball 113 shown in FIG. 4 is an irregular spheroid in that it has a flattened surface 400 over a portion of the ball 113 resulting in a conical cross-section through a portion of the ball 113. Other modifications or alternatives to the spheroid ball 113 may be utilized in the disclosed eyeglass frame so long as the ball 113 and socket 115 provide a fixed orientation when subjected to normal forces of wear, but flex and dislocate without damage when subjected to higher than normal forces.

As depicted in FIG. 4, the ball 113 is connected to the socket 115 by aligning the two components and pressing the ball 113 into socket 115. Elastic band 116 may be inserted through channel 118 either before or after the ball is inserted into the socket.

Figure 5:
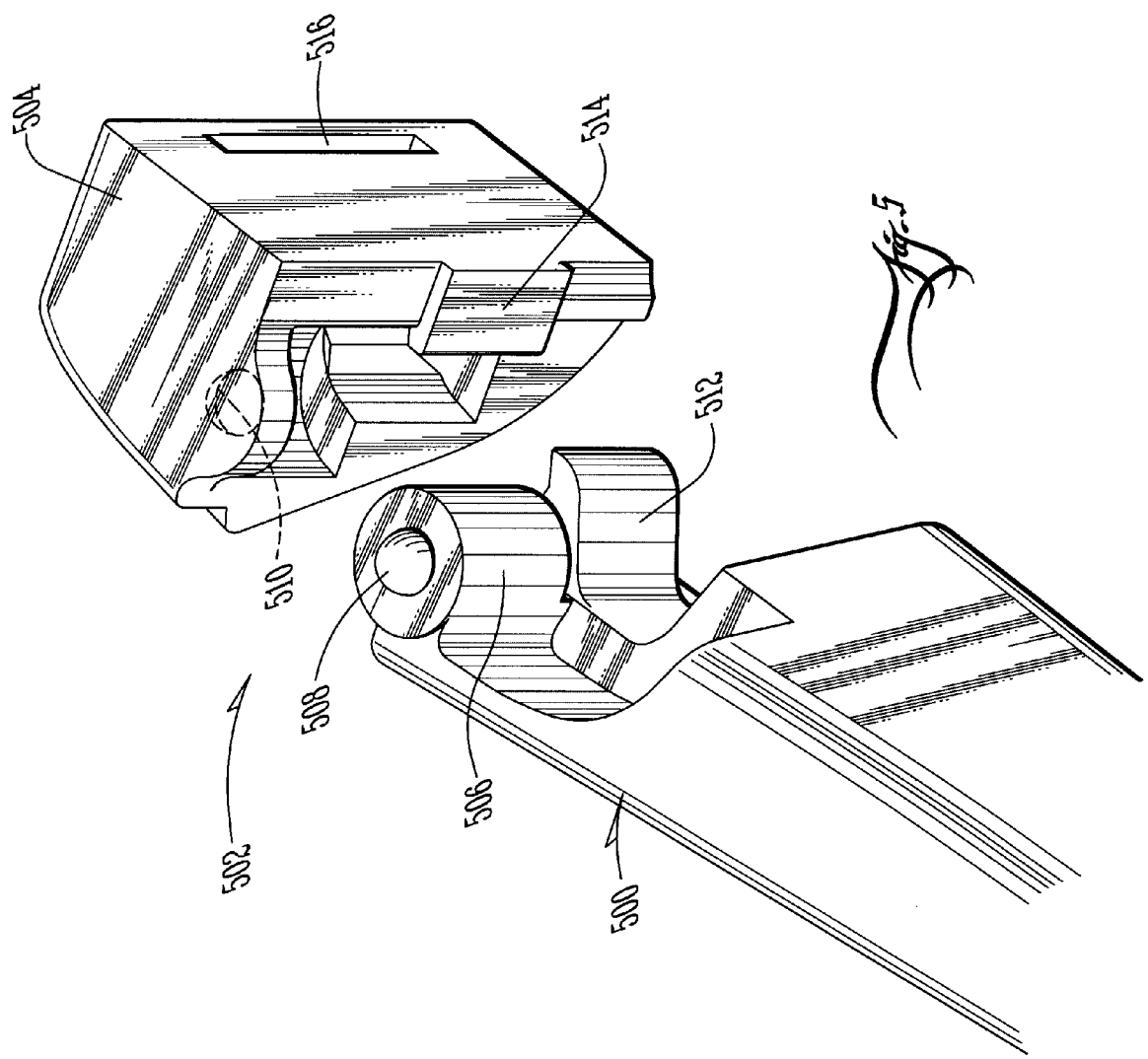
FIG. 5 is an exploded perspective view of the temple arm joint of an embodiment of the eyeglass frame in a disassembled configuration.
Figure 6:
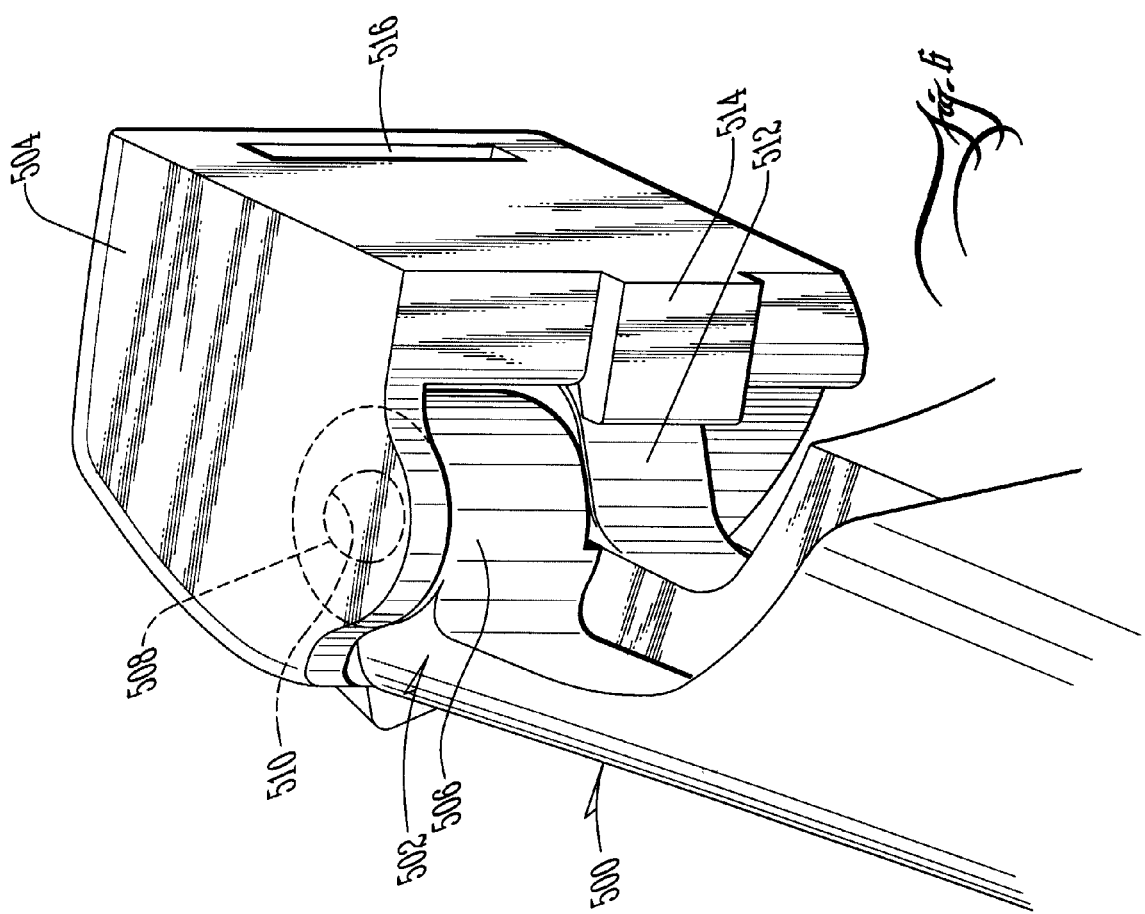
FIG. 6 is a perspective view of the temple arm joint of an embodiment of the eyeglass frame.
Figure 7:
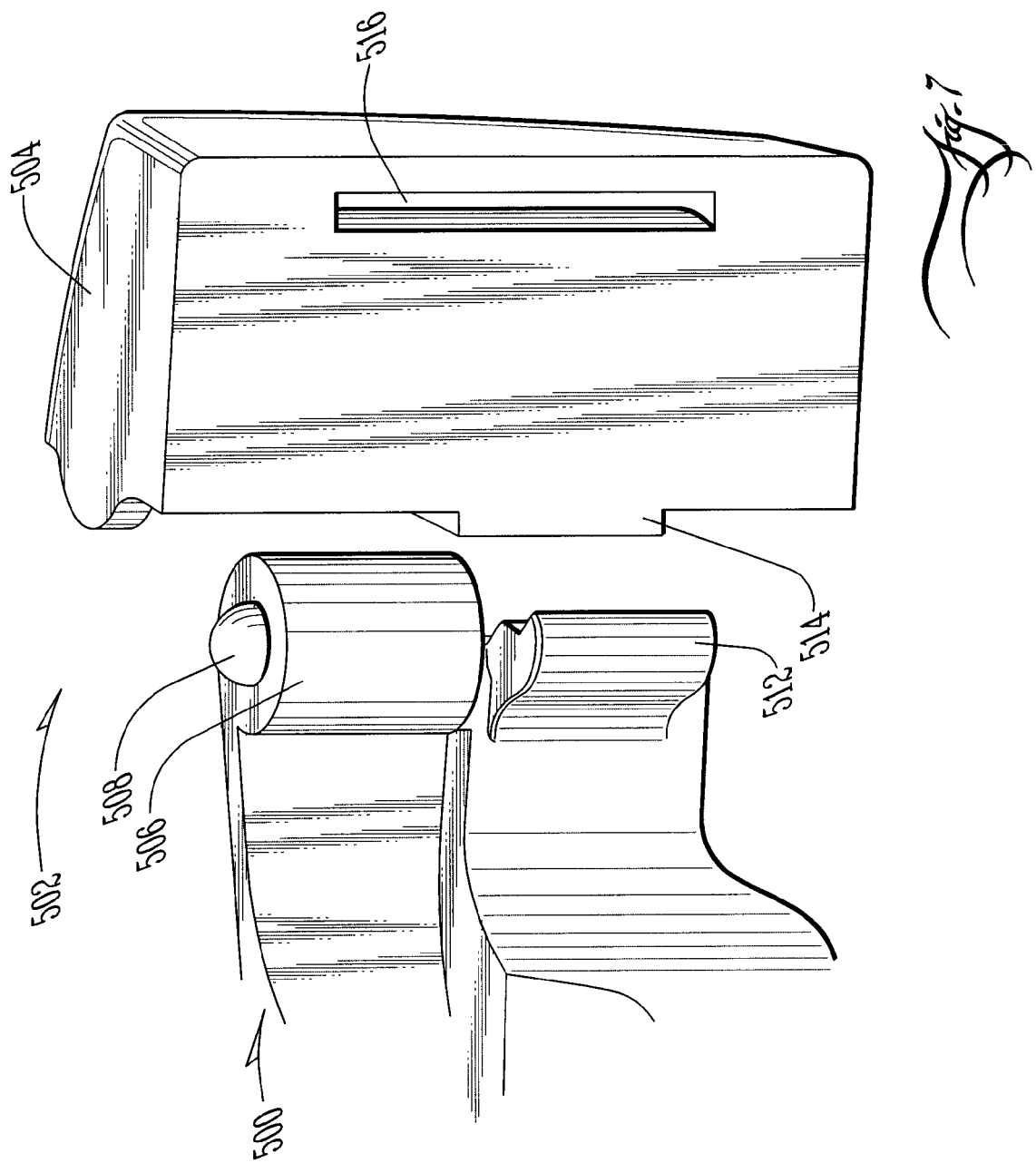
FIG. 7 is a partial exploded side view of the temple arm joint of an embodiment of the eyeglass frame in a disassembled configuration.

Referring now to FIGS. 5, 6 and 7, various views of the temple arm, or side arm, joint of an embodiment of the eyeglass frame are depicted. The temple arm joint of the eyeglass frame is also capable of dislocating under external forces before the occurrence of damage to the eyeglass frame. The side arm, or temple arm, 500 is provided with a hinge 502 for engaging the socket member 504, which is provided with a socket for receiving and retaining the hinge 502. The socket members 504 are attached to or formed as part of rim members 106 and 108.

Hinge 502 comprises a hinge cylinder 506 which fits into the socket in member 504 and which contacts the inner wall of said socket to locate the temple arm in relation to socket member 504 and allow it to rotate around hinge 502. On the top of cylinder 506, protrusion 508 is provided to engage an indentation 510 in the inner surface of the socket. In the depicted embodiment, the protrusion 508 is hemispherical, though in other embodiments the detent may be conical, frusto-conical, cylindrical or other shapes. The hinge 502 is inserted into the socket in socket member 502 and maintained in the socket by the protrusion 508 engaging indentation 510 and the contact between the cylinder 506 and the inner surface of the socket in socket member 504. The side arm can be rotated around the hinge 502.

The hinge 502 also incorporates detent 512 located below the cylinder 506. The detent 512 extends to the side of the cylinder 506 and may be a partial cylinder with an axis offset from the axis of cylinder 506, or other suitable shapes. The outer surface of detent 512 contacts stop 514 provided on socket member 504 to prevent rotation past the desired point, but allows the arm to be folded against the rim members 106 and 108 when not in use. Both detent 512 and stop 514 retain the temple arm 500 in the socket during normal use but may flex under external forces to allow the temple arm 500 to dislocate from the socket member 504.

Figure 8:
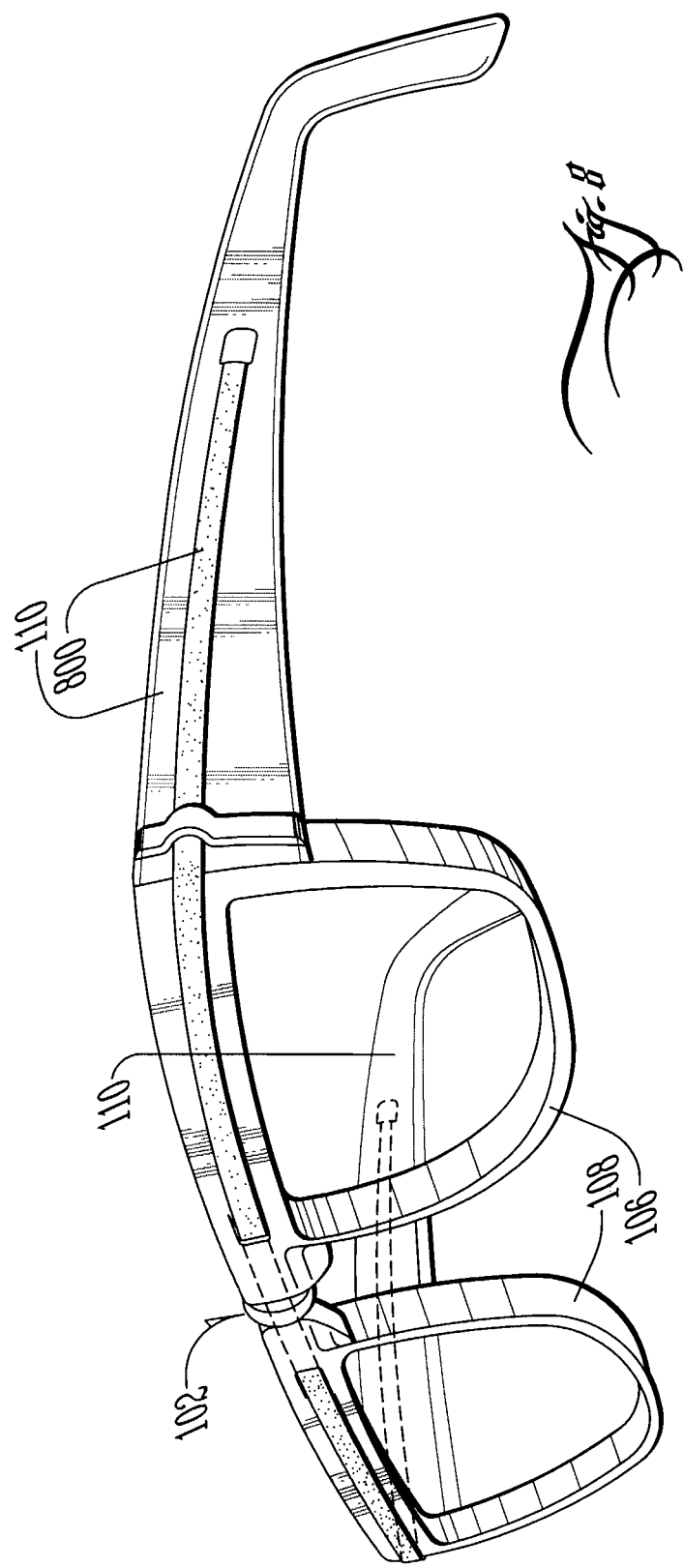
FIG. 8 is a perspective view of a second embodiment of the eyeglass frame.

Socket member 504 is provided with channel 516 for receiving an elastic band shown in FIGS. 1 and 8. In some embodiments the elastic band runs through the socket in member 504 and connects to the outer surface of temple arm 500 as shown in FIG. 1. In other embodiments, the elastic band may run from channel 516 into a channel in arm 500 or may otherwise connect to arm 500. In yet other embodiments the elastic band may run through rim members 106 and 108 to the nose bridge and the other side arm of the eyeglass frame as shown in FIG. 8. The elastic band provides tension to keep the temple arms in position during normal wear and when dislocated to keep the side arms from separating from the rim members of the eyeglass frame.

Referring now to FIG. 8, an alternative embodiment of the eyeglass frame is depicted. This embodiment has a single elastic band 800 running over the outer surface of the eyeglass frames, from the temple arm on each side arm 110 through the nose bridge 102 to the other side arm and temple arm.

Figure 9:
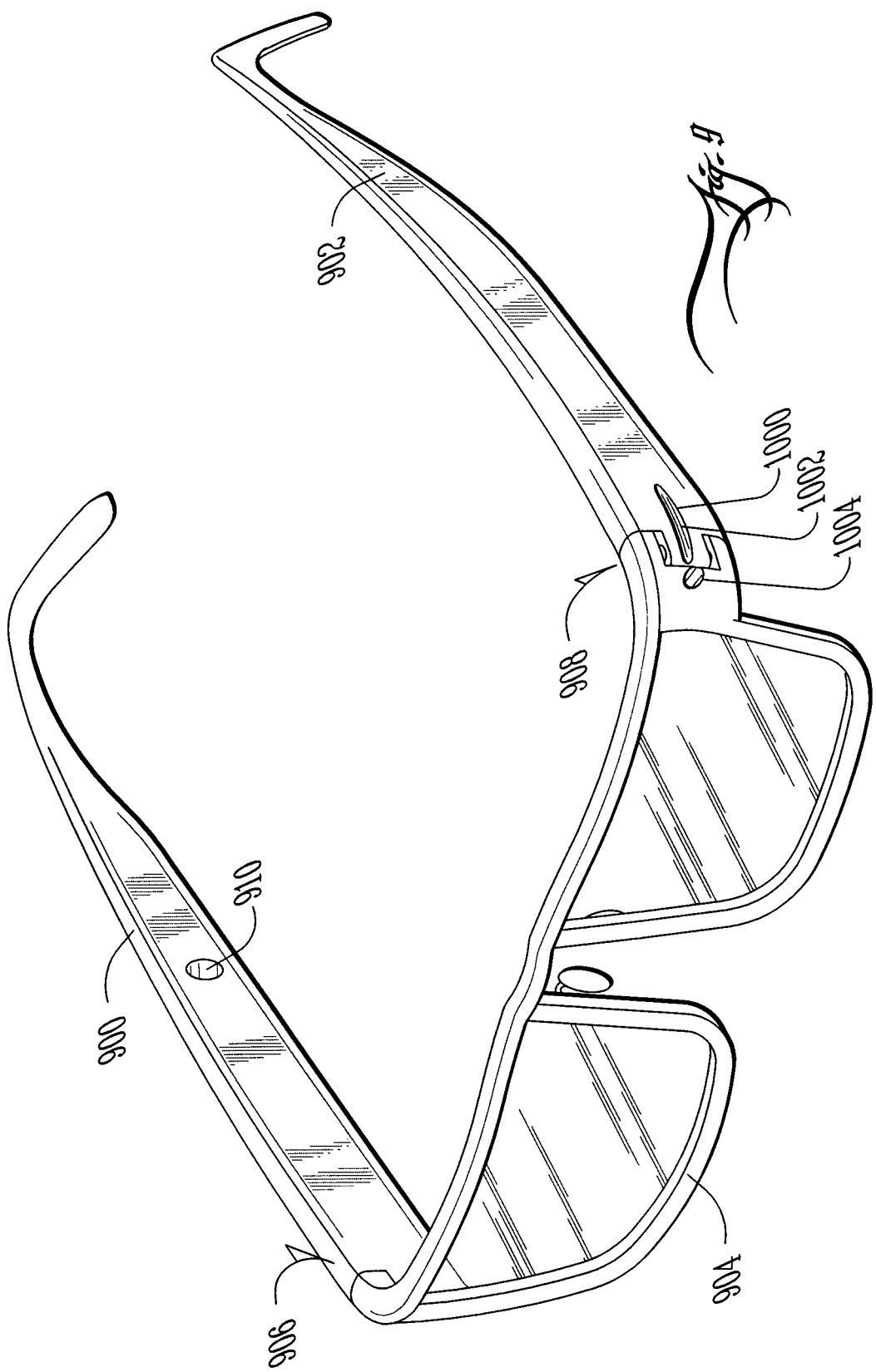
FIG. 9 is a perspective view of a third embodiment of the eyeglass frame.
Figure 10:
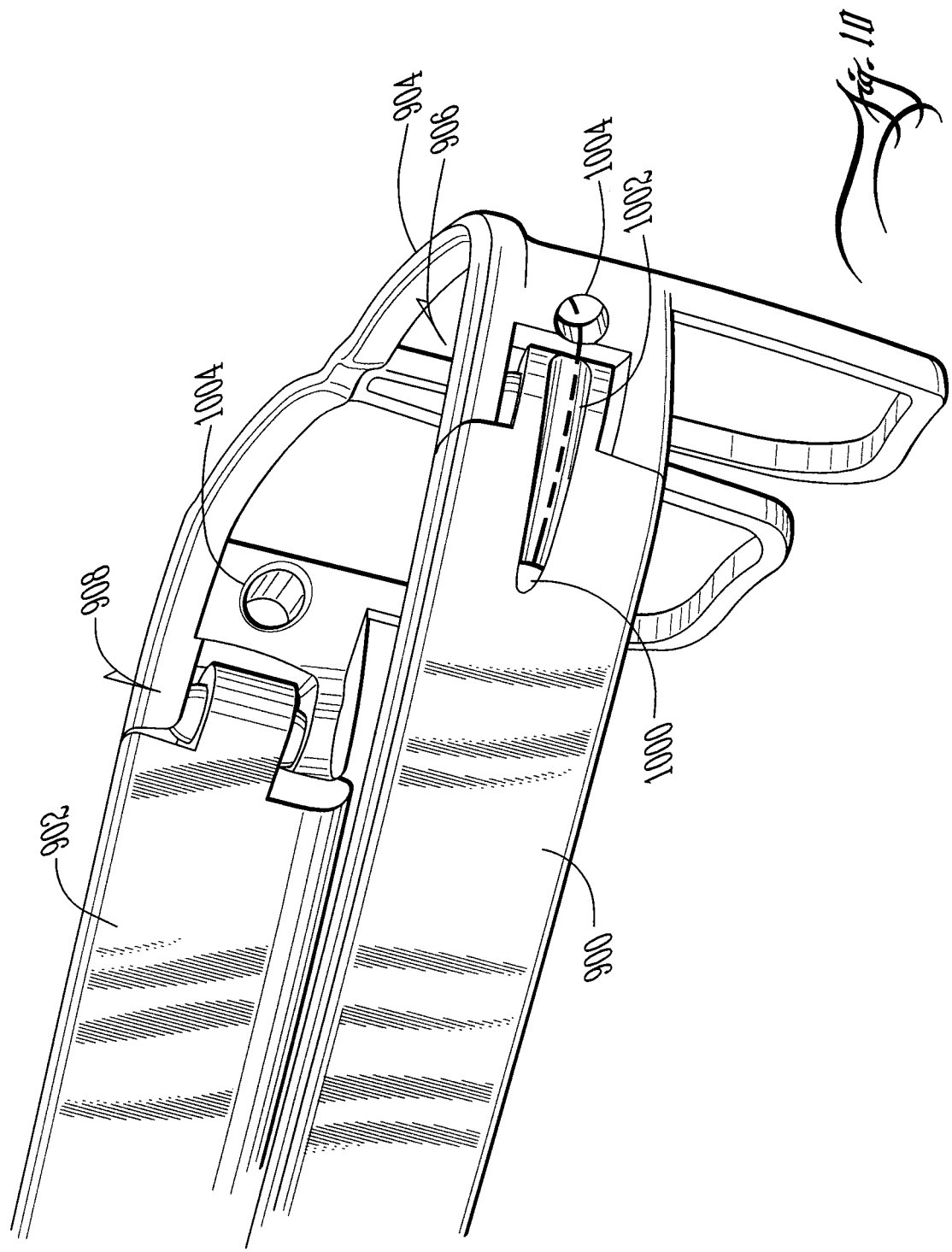
FIG. 10 is a partial perspective view of the third embodiment of the eyeglass frame.

Referring now to FIGS. 9 and 10, an alternative embodiment of the eyeglass frame is depicted. The embodiment shown does not include the breakaway nosepiece, but only the breakaway temple arms 900 and 902. The two temple arms are connected to the rim 904 by hinges 906 and 908. The hinges 906 and 908 allow the temple arms 900 and 902 to break away from the rim member 904 under increased bending stresses. Temple arms 902 and 900 are retained in hinges 906 and 908 by elastic cords not shown in FIG. 9. Temple arm hinges 906 and 908 are as described in relation the temple arm hinges depicted in FIGS. 13 and 14.

Each elastic cord is disposed in a channel that runs inside the respective temple arm. One terminus 910 of the channel can be seen exiting the temple arm on the inside surface thereof. In other embodiments, the channel may exit the temple arm on a different surface of the temple arm, either upper, lower or outside surfaces. The terminus 910 of the channel may be provided with a pocket for receiving a retaining means for the end of the elastic cord. The retaining means may comprise a knot in the elastic cord, a clip or ring secured to the elastic cord, or some other means of securing a fixed point on the elastic cord at the terminus 910 of the channel. This allows the elastic cord to be stretched to provide tension to hold the hinges 906 and 908 in position during normal use, but still providing flexibility to the hinges when they are placed under abnormal forces.

Continuing to refer to FIGS. 9 and 10, a detailed perspective view of the area of hinges 906 and 908 in the embodiment shown in FIG. 9 is depicted. A second terminus 1000 exits from temple arms 900 and 902 near each hinge 906 and 908. The elastic cord extends out of the terminus and across the outer surface of the hinge 906 or 908. The temple arms 900 and 902 may be provided with a groove 1002 adjacent to terminus 1000 for receiving the elastic cord and maintaining the cord in the appropriate position. The rim member 904 is provided with channels 1004 for receiving the elastic cords. The elastic cords are directed from groove 1002 into channels 1004 and retained on the opposite side of rim member 904. The elastic cord may be retained by a knot in the cord, a retaining clip or other similar means of retaining elastic cords known in the art. As described above, the elastic cords are retained at each end in a stretched position to hold the temple arms in an opened position under tension.

Referring now to FIG. 11, a perspective view of a fourth alternative embodiment of the eyeglass frame is depicted. The depicted embodiment includes the dislocating nose bridge. This embodiment comprises temple arms 1100 and 1102, and right and left rim members, 1104 and 1106 respectively. The temple arms are attached to the rim members at hinges 1108 and 1110. A hinge 1112 in the nose bridge of the eyeglass frame allows the bridge area to flex or dislocate without permanent damage to the eyeglass frame. The temple arms 1100 and 1102 are provided with internal channels for receiving elastic cords, which channels have an opening on the inner surface of the temple arms at terminus 1114 and 1116 (not visible in FIG. 11). The channels also have an opening on the exterior surface of the temple arms at 1118 (not visible in FIG. 11) and 1120. In the depicted embodiment grooves 1122 (not visible in FIG. 11) and 1124 are provided in each temple arm to guide the elastic cord to the openings 1126 and 1128 in the rim members 1104 and 1106, respectively.

Referring now to FIG. 12, a detailed perspective view of hinge 1110 in the embodiment shown in FIG. 11 is depicted. The path of the elastic cord, or bungee cord, is depicted, exiting from terminus 1120 and following groove 1124 before entering the channel in rim member 1106 through opening 1128.

Referring now to FIG. 13, an exploded view of the embodiment depicted in FIGS. 11 and 12 is depicted. The embodiment depicted in FIG. 13 has decorative differences in the temple arms 1100 and 1102 but functionally is the same as the depictions in FIGS. 11 and 12. Temple arms 1100 and 1102 are shown detached from rim members 1104 and 1106, and the two rim members 1104 and 1106 are detached at the nose bridge hinge 1112.

Referring now to FIG. 14, an exploded detail perspective view of hinge 1110 is depicted for the embodiment shown in FIG. 13. The embodiment of the hinge 1110 shown in FIG. 14 comprises a pivot hinge, with a hinge body 1400, protrusions 1402 disposed on the axis of rotation of the hinge, hinge arms 1404 and indentations 1406. When hinge 110 is attached, protrusions 1402 engage indentations 1406 and allow the hinge to rotate around its axis. The hinge is designed so that the temple arm 1102 may be popped into and out of the rim member 1106 if the hinge 1110 experiences abnormal forces. The hinge arms 1404 may be provided with a stop 1408 to engage the temple arm 1102. The stop 1408 contacts the end of temple arm 1102 and prevents the tension in the elastic cord from rotating the temple arm 1102 away from the head of the user.

Referring now to FIG. 15, an exploded detail perspective view of hinge 1112 in the embodiment depicted in FIG. 14 is depicted. The rim member 1104 is provided with hinge body 1500. Hinge arms 1504 are provided on rim member 1106 to receive the hinge body 1500. On the top and bottom surface of hinge body 1500, protrusions 1502 are provided to engage indentations 1506 that are provided on the inside surfaces of hinge arms 1504. The indentation in the upper hinge arm 1504 is not visible in FIG. 15. Rim members 1104 and 1106 are provided with channels running through the upper portion thereof, above the location of the eyeglass lens. The channels exit the two rim members at openings 1508. The channels extend through the rim members and exit at openings 1128 near hinges 1110 and 1108. The elastic cord extends from the retention points at 1114 on each temple arm, through hinges 1108 and 1110 and through hinge 1112 at the nose bridge. The elastic cord provides tension through all the hinges to secure them in the appropriate configuration for a user to wear the glasses, but allow the hinges to flex or dislocate before breaking if abnormal forces are encountered.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed is:

1. A frame for eyeglasses comprising:
   a left rim member and a right rim member;
   a nose bridge assembly connecting the left rim member to the right rim member;
   a left temple arm and a right temple arm;
   a left and a right dislocating joint connecting the left temple arm and the right temple arm to the left rim member and the right rim member, respectively;
   wherein the nose bridge assembly comprises a left and a right nose bridge component, a channel disposed through the left and right nose bridge components, and an elastic band disposed in the channel and anchored to the frame so as to resist the separation of the left and right nose bridge components;
   and wherein a channel is provided in each of the left and right rim members and the left and right temple arms for receiving the elastic band wherein one end of the elastic band is secured in the channel in the left temple arm and the other end of the elastic band is secured in the channel in the right temple arm; and the elastic band extends through the channel in the left and right temple arms and the left and right rim members to flexibly attach the members together;
   and wherein the left and the right nose bridge components comprise a ball member having a ball on a first end thereof and a socket member having a socket on a first end thereof, wherein the ball is disposed in the socket.

2. The frame of claim 1 wherein the left and the right dislocating joints each comprise:
   a left and a right socket member attached to the left and the right rim member, respectively;
   a left and a right hinge member attached to the left and right side temple arms, respectively;

wherein the left and the right socket member comprise a socket for receiving the hinge member and a stop member; and wherein the left and the right hinge member each comprise a cylinder having two circular ends and a face extending therebetween, a protrusion on at least one of the circular ends of the cylinder for engaging the indentations in the socket, and a detent for engaging the stop member on the socket member.

3. The frame of claim 2 wherein a first end of the channels in each of the left and right temple arms terminates at a point along the length of each temple arm with an opening wherein a retention device is provided to secure the ends of the elastic band at said points.

4. A frame for eyeglasses comprising:
a left rim member and a right rim member;
a nose bridge assembly connecting the left rim member to the right rim member;
a left temple arm and a right temple arm;
a left and a right dislocating joint connecting the left temple arm and the right temple arm to the left rim member and the right rim member, respectively;
wherein the nose bridge assembly comprises a left and a right nose bridge component, a channel disposed through the left and right nose bridge components, and an elastic band disposed in the channel and anchored to the frame so as to resist the separation of the left and right nose bridge components;
and wherein a channel is provided in each of the left and right rim members and the left and right temple arms for receiving the elastic band, wherein one end of the elastic band is secured in the channel in the left temple arm and the other end of the elastic band is secured in the channel in the right temple arm; and the elastic band extends through the channel in the left and right temple arms and the left and right rim members to flexibly attach the members together;
and wherein the left and right nose bridge components comprise:
a hinge member attached to one of the left or right rim members having protrusions on the top and bottom of the hinge member; and
a hinge arm member attached to the other of the left or right rim members having a top and a bottom arm with indentations therein for receiving the protrusions on the hinge member;
wherein the hinge member is pivotally maintained between the top and bottom arms of the hinge arm member by the engagement of the protrusions into the indentations.

5. The frame of claim 4 wherein the left and the right dislocating joints each comprise:
an temple hinge member attached to each of the left and right temple arms having protrusions on the top and bottom of the hinge member;
an temple hinge arm member attached to each of the left and right rim members, each temple hinge arm member having a top arm and a bottom arm with indentations therein for receiving the protrusions on the temple hinge member;
wherein the temple hinge member is pivotally maintained between the top and bottom arms of the temple hinge arm member by the engagement of the protrusions on the temple hinge member into the indentations on the temple hinge arm member.

6. The frame of claim 5 wherein each temple hinge member further comprises a groove in communication with the channel in the temple arm for receiving and retaining the elastic band.

7. A frame for eyeglasses comprising a left temple arm, a right temple arm, a left rim, a right rim, and an elastic band, wherein the left rim and the right rim are releaseably connected at a bridge; the left temple arm is releaseably connected to the left rim; the right temple arm is releaseably connected to the right rim; and the elastic band is disposed through the releaseable connection at the bridge.

8. The frame of claim 7 wherein the releaseable connection at the bridge comprises a ball member attached to one of the left or right rim members and a socket member attached to the other of the left or right rim members.

9. The frame of claim 8 wherein the releaseable connection between the left and right temple arms and the left and right rims comprise a hinge socket and a stop member disposed in each of the left and right rim members, a detent and a hinge cylinder having a protrusion on one end thereof disposed on each of the left and right temple arms; wherein the hinge socket further comprises an indentation for engaging the protrusion on the hinge cylinder, and wherein the stop member engages the detent.

10. The frame of claim 9 wherein the elastic band is disposed in a channel through each of the left and right rim members and attached at opposing ends thereof to the left and right temple arms.

11. The frame of claim 7 wherein the releaseable connections at the bridge and between the rims and the temple arms each comprise a middle hinge arm attached to one of the left or right rim members or to one of the left or right temple arms, and a top and bottom hinge arm attached to the left or right rim members; wherein the middle hinge arm further comprises a protrusion on each of a top and a bottom surface of the middle hinge arm; and wherein the top hinge arm further comprises an indentation on a bottom surface thereof; and wherein the bottom hinge arm further comprises an indentation on a top surface thereof; and wherein the protrusions engage the indentations to retain the middle hinge arm between the top and bottom hinge arms.

12. A frame for eyeglasses comprising a left temple arm, a right temple arm, a rim member, and a first and a second elastic band, wherein the left temple arm is releaseably connected to the rim member; the right temple arm is releaseably connected to the rim member; and the first and second elastic bands are disposed through the releaseable connections between the left and right temple arms and the rim member;
and wherein the releaseable connections between the rim member and the left and right temple arms each comprise a middle hinge arm attached to one of the left or right temple arms, and a top and bottom hinge arm attached to the rim member; wherein the middle hinge arm further comprises a protrusion on each of a top and a bottom surface of the middle hinge arm; and wherein the top hinge arm further comprises an indentation on a bottom surface thereof; and wherein the bottom hinge arm further comprises an indentation on a top surface thereof; and wherein the protrusions engage the indentations to retain the middle hinge arm between the top and bottom hinge arms.

13. The frame of claim 12 wherein each of the first and second elastic bands are disposed in a first and a second channel through opposing ends of the rim member and attached at opposing ends thereof to the left and right temple arms and the rim member.

* * * * *